(12) United States Patent
Hoeksel et al.

(10) Patent No.: US 9,894,060 B2
(45) Date of Patent: Feb. 13, 2018

(54) MACHINE-TO-MACHINE DEVICE AND SMARTCARD FOR USE IN THE DEVICE

(75) Inventors: Sebastiaan Hoeksel, Maastricht (NL); Najib Koraichi, Schimmert (NL); Robert van Muijen, As (BE)

(73) Assignee: VODAFONE HOLDING GMBH, Dusseldorf (DE)

( * ) Notice: Subject to any disclaimer, the term of this patent is extended or adjusted under 35 U.S.C. 154(b) by 1956 days.

(21) Appl. No.: 12/617,274

(22) Filed: Nov. 12, 2009

(65) Prior Publication Data

US 2011/0132987 A1    Jun. 9, 2011

(30) Foreign Application Priority Data

Nov. 13, 2008  (EP) .................................. 08019831

(51) Int. Cl.
*H04W 4/00* (2009.01)
*H04L 29/06* (2006.01)
*H04L 29/08* (2006.01)

(52) U.S. Cl.
CPC .......... *H04L 63/0853* (2013.01); *H04L 67/12* (2013.01); *H04L 67/125* (2013.01); *H04W 4/003* (2013.01); *H04W 4/005* (2013.01); *G05B 2219/31251* (2013.01); *G05B 2219/33192* (2013.01)

(58) Field of Classification Search
CPC ....................................................... H04W 4/00

USPC .......................................... 340/539.1–539.13
See application file for complete search history.

(56) References Cited

U.S. PATENT DOCUMENTS

| 7,978,062 B2 * | 7/2011 | LaLonde et al. ........ 340/539.11 |
| 2009/0172235 A1 * | 7/2009 | Yan et al. ..................... 710/302 |
| 2010/0291907 A1 * | 11/2010 | MacNaughtan et al. .. 455/414.1 |

OTHER PUBLICATIONS

Chen, Zhiqun, Chapter 3: Java Card Technology for Smart Cards: Architecture and Programmer's Guide, Book, Jun. 16, 2000, pp. 28, Addison Wesley Publishers, English.

* cited by examiner

*Primary Examiner* — Christle I Marshall
(74) *Attorney, Agent, or Firm* — International IP Law Group, PLLC

(57) ABSTRACT

There is provided a method device for facilitating remote access capability. An exemplary device comprises a connection module for connecting the device to a remote location. The exemplary device also comprises a smartcard comprising a secure identification and/or authentication component. The exemplary device additionally comprises a control module, at least part of which is comprised in the smartcard, interfacing with the connection module and with a component of the device, the control module being adapted to access the component in conjunction with a communication between the control module and the remote location via the connection module.

13 Claims, 3 Drawing Sheets

MACHINE-TO-MACHINE DEVICE AND SMARTCARD FOR USE IN THE DEVICE

CROSS REFERENCE TO RELATED APPLICATION

This application claims priority to European (EP) Patent Application No. 08 019 831.0, filed on Nov. 13, 2008, the contents of which are incorporated by reference as if set forth in their entirety herein.

BACKGROUND

The term machine-to-machine technology or the alternative terms man-to-machine, machine-to-man, machine-to-mobile and mobile-to-machine technology, which are all abbreviated as M2M technology, generally refer to data communications between machines. In particular, the M2M technology allows for accessing devices or functionalities of devices from a remote location. Typically, the M2M technology is used for collecting information, sending indications of unusual situations, and setting parameters or otherwise controlling devices from remote locations.

One possibility to connect an M2M device and a remote location is to set up a connection via a communication network, particularly via a mobile communication network, such as, for example, a GSM (global system for mobile communications) or UMTS (universal mobile telecommunications system) network. As schematically depicted in FIG. 1, components of the M2M device 102, which may be actuators 104 and/or sensors 106 connected to a radio module 108, which connects the device 102 with the mobile communication network 112. The application logic of the M2M application is usually included in an application processor 110, which connects the actuators 104, sensors 106 and the radio module 108. Since access to mobile communication networks 112 is usually limited to registered subscribers, the device 102 comprises a smartcard 114 that may also be connected to the application processor 110 and that provides information for identifying and authenticating the device or its user to the mobile communication network 112. If the mobile communication network is a GSM or UMTS network, the smartcard 114 comprises a SIM (subscriber identity module) or USIM (universal subscriber identity module) application.

M2M applications often require a relatively high degree of security in order to prevent fraudulent access to the M2M device. This is especially but not exclusively relevant for M2M solutions that allow for over-the-air management or update of the application logic after the device has been issued. However, the security requirements render the application processor relatively complex thereby reducing the economic efficiency of the device.

SUMMARY OF THE INVENTION

An exemplary embodiment of the present invention is related to machine-to-machine technology. More specifically, exemplary embodiments of the invention relate to a device having remote access capability. Furthermore, exemplary embodiments may relate to a smartcard for use in a device having remote access capability, a use of the smartcard in a device having remote access capability and to a method for communicating with a device from a remote location.

Exemplary embodiments of the present invention may operate to increase the economic efficiency of a secure M2M device.

According to an exemplary embodiment of the invention, a device having remote access capability is suggested. The exemplary device comprises:
  a connection module for connecting the device to a remote location;
  a control module interfacing with the connection module and with a component of the device, said control module being adapted to access the component in conjunction with a communication between the control module and the remote location via the connection module; and
  a smartcard comprising a secure identification and/or authentication component.
At least part of the control module may be comprised in the smartcard.

According to another exemplary embodiment of the invention, a smartcard for use in the device is provided. The exemplary smartcard comprises the secure identification and/or authentication component and is characterized in that at least part of the control module is included, the control module being adapted to access the component of the device in conjunction with a communication between the control module and the remote location via the connection module.

Another exemplary embodiment of the present invention relates to a smartcard in a device comprising a connection module for connecting the device to a remote location and a control module interfacing with the connection module and with a component of the device. The control module may be adapted to access the component of the device in conjunction with a communication between the control module and the remote location via the connection module. In the exemplary device, the smartcard is used for providing a secure identification and/or authentication component and for providing at least part of the control module.

According to another exemplary embodiment of the invention, a method for accessing a device from a remote location is suggested. The exemplary method comprises:
  providing a connection module for connecting the device to the remote location;
  providing a smartcard comprising a secure identification and/or authentication component,
  connecting the smartcard to the connection module and to a component of the device, and
  integrating a control module into the smartcard, the control module being adapted to access the component in conjunction with a communication between the control module and the remote location via the connection module.

In an exemplary embodiment of the invention, the control module may be integrated into the smartcard. Since the smartcard is already present in the device in order to provide a secure identification and/or authentication component, this leads to a reduced number of components in the device and to an increasing economic efficiency. Moreover, the control module can be integrated into the secure environment provided by the smartcard so that fraudulent access to the control module is prevented without additional security measures.

The control module may access the component of the device in response to a request or control command from the remote location, for example. This allows for controlling the component from the remote location. However, the control module may also access the component before communicating with the remote location. Particularly, the control module may receive information from the component and the information is forwarded to the remote location or the information is evaluated and the result of the evaluation is provided to the remote location.

In one exemplary embodiment of the device, the smartcard, the use and the method, the device may be connectable to the remote location via a communication network, which can be accessed via the connection module.

In this exemplary embodiment, the smartcard may provide an identification and/or authentication service for accessing the network, which may be a mobile communication network, for example. Particularly, the smartcard may provide information for identifying and/or authentication the device or a user of the device to the communication network. If the communication network is a mobile communication network according the GSM or UMTS standard, the smartcard particularly comprises a SIM or USIM application providing the secure identification and/or authentication service.

In addition or as an alternative to the service for identifying and authenticating the device to the network, the smartcard may provide an identification and/or authentication service for identifying and/or authenticating the remote location. This function may also be used, if the device and the remote location are not connected via a communication network requiring user authentication, but via a direct connection, for example. The function may be provided by an application, which is included in the smartcard in addition or instead of the SIM or USIM application.

Usually, the smartcard is connected to the connection module using an interface of the smartcard, which is adapted to the conventional functionalities of the card—particularly to the provided identification and/or authentication function. For providing the functionalities of the control module this interface can be unsuitable or at least suffer from disadvantages, such as, for example, a high complexity in the realisation of the control module.

Therefore, in one exemplary embodiment of the device, the smartcard, the use and the method, the smartcard may provide different interfaces for connecting to the component and to the connection module.

In a related exemplary embodiment of the device, the smartcard, the use and the method, the smartcard and the component may be connected via a USB (universal serial bus) interface or a SWP (single wire protocol) interface of the smartcard.

The USB interface for smartcards has been standardised recently. The USB has the advantage to be a widely used standard for interfaces of different types and to allow for a straightforward realisation of the connection between the component and the smartcard. For similar reasons, the SWP facilitates the realisation of the connection between the component and the smartcard.

However, it is likewise possible to connect the component to the smart card using another interface of the smart card. Particularly, the conventional interface according to ISO 7816-3 may be used.

However, there may be components, which do not support the USB or SWP. Therefore, in one exemplary embodiment of the device, the smartcard, the use, and the method, the device further comprises an interface controller connected between the smartcard and the component, the interface controller being adapted to communicate with the smartcard using a first connection type and to communicate with the component using a second connection type being different from the first connection type.

The interface controller translates data signals exchanged between the component and the smartcard according to the interfaces the component and the identification module provide. While the interface controller is an additional component of the device, it is considerably less complex and hence less costly than an additional application processor providing the control module that is dispensed with by integrating the control module into the smartcard.

As described before, the interface of the smartcard for connecting to the component may be based on the USB or the SWP. Therefore, in one exemplary embodiment of the device, the smartcard, the use and the method, the first connection type includes a USB or a SWP connection.

Furthermore, in one exemplary embodiment of the device, the smartcard, the use and the method, the control module can be modified based on data received via the connection module, if the data is cryptographically validated in the smartcard.

A related exemplary embodiment of the device, the smartcard, the use and the method provides that the data is encrypted via an encryption key and the validation of the data comprises decrypting the data using a decryption key corresponding to the encryption key, said decryption key being securely stored in the smartcard.

Usually, in communication networks, there exists a well-established secure mechanism for updating smartcards. Advantageously, such mechanisms can be used for modifying the control module in order to make updates after the issuance of the device. The validation of the data may be carried out in the identification and/or authentication component of the smart card.

In mobile communications, particular in GSM and UMTS networks, the mechanisms for remote management and update of smartcards are referred to as OTA mechanisms. In the OTA mechanism, one or more symmetric cryptographic keys are shared between an OTA gateway and a smartcard. These keys are used in the smartcard for validating received data, particularly to check the integrity and/or authenticity of the data. In another exemplary embodiment, an asymmetric key pair may be used, where the OTA gateway uses an encryption key for encrypting the data and the smartcard uses a corresponding decryption key for decrypting and verifying the data.

The smartcard comprises a microcontroller for executing software applications. This makes it possible that the control module is configured as a software application run on the microcontroller of the smartcard in one exemplary embodiment of the device, the smartcard, the use and the method.

Moreover, in one exemplary embodiment of the device, the smartcard, the use and the method, the smartcard may comprise a Java Card and the software application may comprise a Java Card Applet.

In an exemplary embodiment of the present invention, the Java framework, which is supported by so called Java Cards, allows for developing software applications—so called Java Card Applets—which can be executed in Java cards of different types or different manufacturers without modifications.

In one exemplary embodiment of the device, the smartcard, the use and the method, the component may be configured as a sensor for measuring a quantity or as an actuator responsive to control signals received via the connection module.

BRIEF DESCRIPTION OF THE DRAWINGS

Reference will be made by way of example to the accompanying drawings in which.

DETAILED DESCRIPTION OF SPECIFIC EMBODIMENTS

Figure 1:
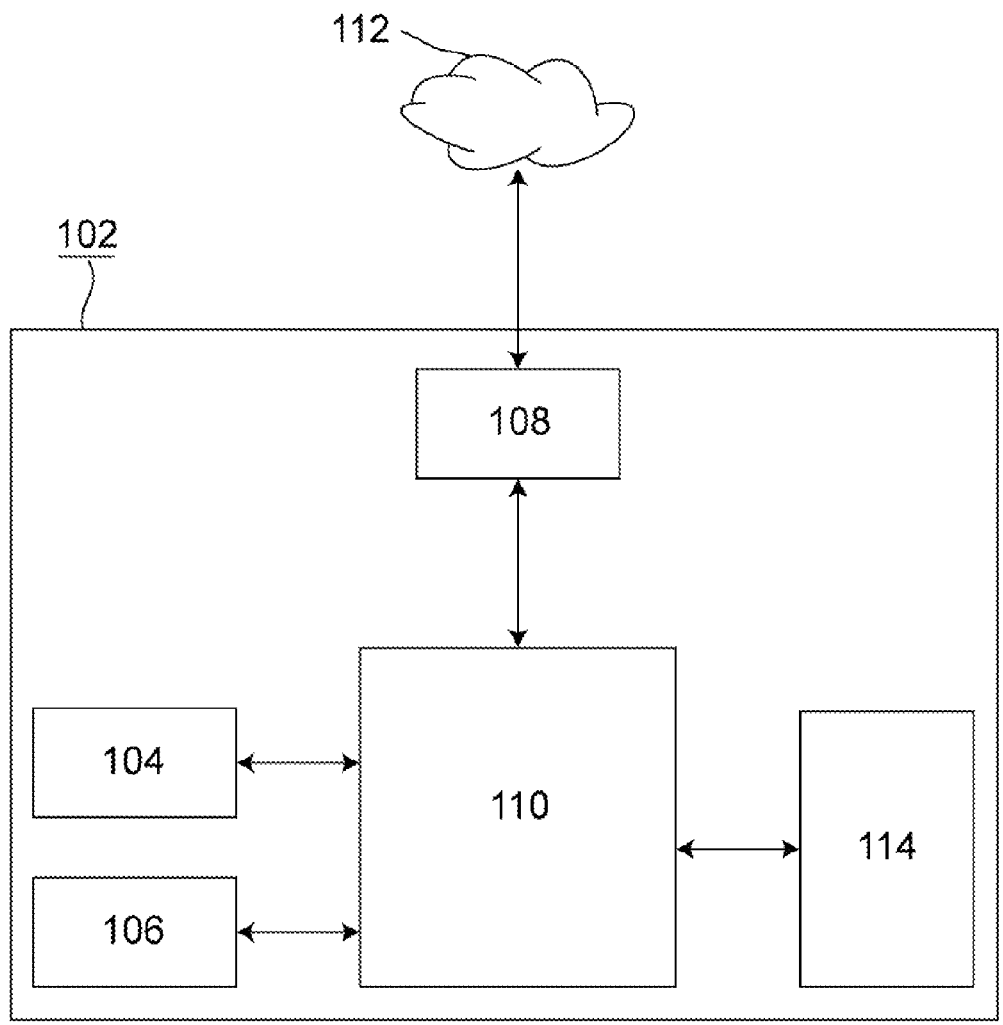
FIG. 1 is a schematic block diagram of a machine-to-machine device according to the state of the art.
Figure 2:
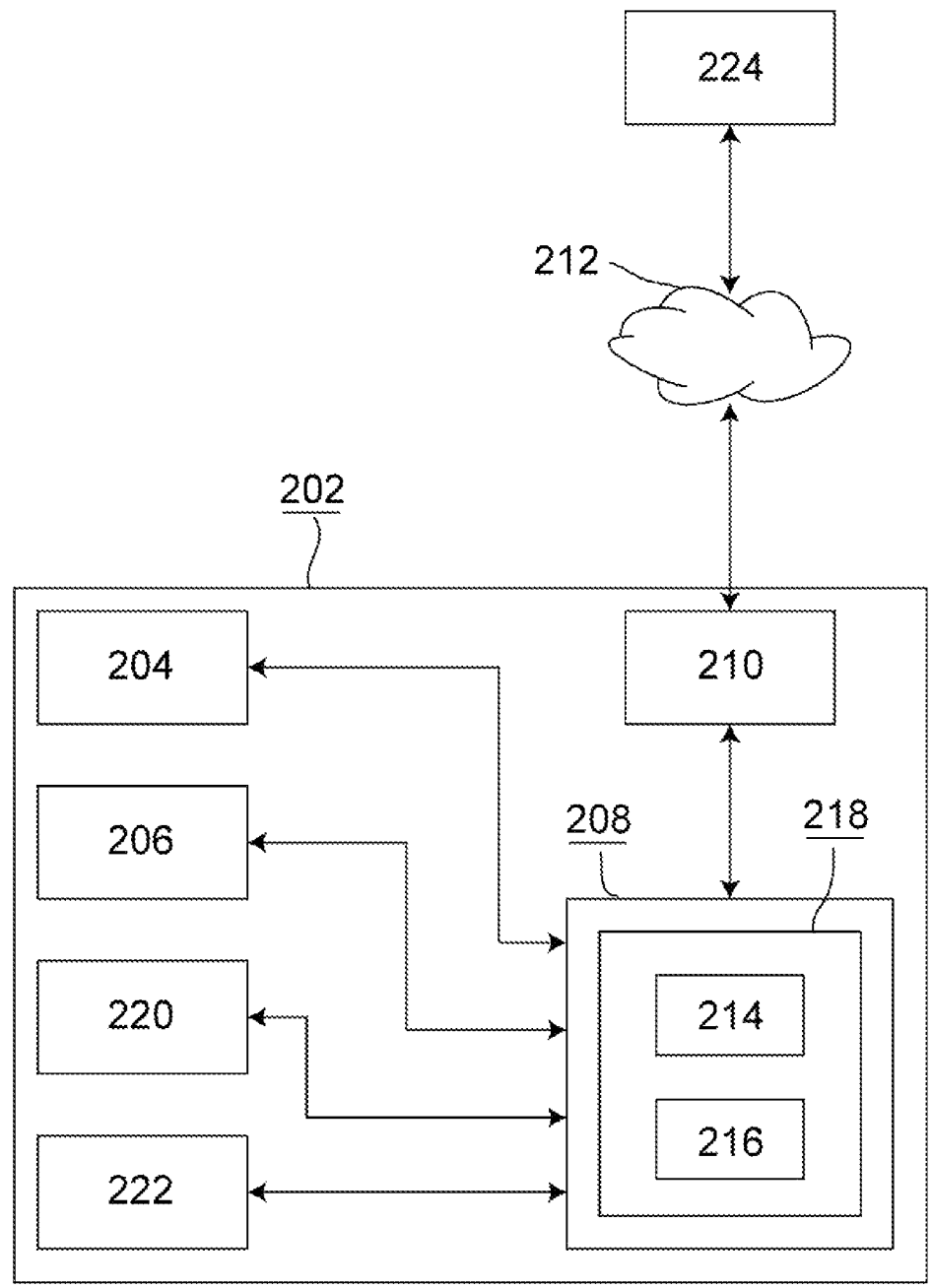
FIG. 2 is a schematic block diagram of machine-to-machine device according to an exemplary embodiment of the present invention.

FIG. 2 schematically shows an exemplary M2M device 202, i.e. a device that is enabled to communicate with a remote location 224. The device 202 contains at least one sensor 204 and/or at least one actuator 206. The sensor 204 is configured to measure certain quantity that is monitored in the remote location 224 and the actuator 206 can be controlled from the remote location 224 to affect the operation or functions of the device 202.

In the exemplary embodiment depicted in FIG. 2 and described hereinafter, the remote location 224 accesses the device 202 via a communication network 212. The device 202 is connected wirelessly to the communication network 212 via a connection module 210, which is configured as a radio module. However, it is likewise possible to connect the device 202 to the remote location in another way using a suitable connection module 210. For instance, the connection between the device 202 and the remote location 224 may be a direct radio connection, an infrared connection or a wired connection.

Optionally, the device 202 also provides operator devices allowing an operator to access the device 202 locally and/or to monitor or control the communication between the remote location 224 and the device 202. The operator devices may comprise a display device 220, such as, for example, a monitor, and an input device 222, such as, for example, a keyboard.

The exemplary device 202 can be an M2M device of any type, which is managed or otherwise accessed from a remote location.

In an exemplary embodiment, the device 202 is a supply meter comprising a sensor 204 for measuring consumption, such as, for example, the consumption of water, gas, electricity or the like. The supply meter may be located at the place of consumption and read out from the remote location 224 so that manual, on-site data collection can be avoided.

A further example is a device 202 in a vehicle comprising one or more actuators 206 that can be controlled from the remote location, i.e. from outside the vehicle. These actuators 206 may include a device that locks the car or a park heating system, for example. Moreover, a vehicle may be equipped with a device 202 comprising one or more sensors 204 for measuring one or more quantities characterizing the driving state of the vehicle or the operating state of components of the vehicle. These sensors 204 may acquire data that can be transmitted to a data centre for evaluation, for example. Particularly, the data may be indicative of an accident allowing the data centre to arrange for emergency aid.

A yet further example is a machine or arrangement comprising electronically controllable shutters, valves or similar actuators 206 that can be controlled from the remote location 224.

More examples of machine-to-machine devices 202 for use in plurality of technical fields, including manufacturing, facility management, transportation and automotive applications, fleet management, healthcare, building automation and security systems, are known to a person skilled in the art.

The communication network 212 connecting the remote location 224 and the device 202 may be configured as a mobile communication network and the remote location may access the mobile communication network 212 directly or via another network, such as, for example, the Internet, which has a gateway to the mobile communication network 212. Particularly, the mobile communication network 212 may be configured according to the GSM standard or according to the UMTS standard. However, the mobile communication network 212 may likewise adopt another mobile communications technology.

The communication between the device 202 and the remote location 224 may be based on any bearer service provided in the mobile communication network 212. Particularly, a bearer service for non-speech data may be used, such as SMS (Short Message Service), USSD (unstructured supplementary services data), CSD (circuit switched data), HSCSD (high speed circuit switched data) or GPRS (general packet radio system). However, it may likewise be provided to exchange information in the form of speech data using a corresponding bearer service of the mobile communication network 212.

The actuators 206, the sensors 204, the radio module 210 and the operator devices 220, 222 are coupled to a smartcard 208. As common for smartcards in general, the smartcard 208 comprises a microcontroller 218 including a microprocessor 214 for running programs and a memory 216 for storing data. The microcontroller 218 provides a secure environment for the execution of application and the storage of data. Particularly, this means that unauthorized access to data and processes is prevented due to the hardware design of the microcontroller 218 and due to cryptographic mechanisms used for managing data in the microcontroller 218. Moreover, the microcontroller 218 may be integrated into a secure hardware environment provided by the smartcard 208, which is physically protected against manipulations, such as, power analysis, reverse engineering etc.

The smartcard 208 provides at least one identification and authentication service. If the smartcard 208 is connected to a communication network 212, the service identifies and authenticates the device 202 or a user of the device 202 towards the communication network 212.

If the mobile communication network 212 is a GSM network, the smartcard 208 is configured as a SIM card according to the GSM standard comprising a SIM application, which provides the identification and authentication service. If the mobile communication network 212 is a UMTS network, the smartcard 208 is configured as a UICC (universal integrated circuit card) comprising a USIM application providing the identification and authentication service. The SIM or USIM application comprises a software code that is stored in the memory 216 of the smartcard 208 and executed by the microprocessor 214. In the following, the expression (U)SIM application is used, which refers to a USIM or a SIM application, depending on which application is used in connection with the existent mobile communication network 212.

In addition to the service for identifying and authenticating the device 202 in the mobile communication network 212, the smartcard 208 may provide a service for identifying and authenticating the remote location 224 in the device 202 and for preventing unauthorized access to the device 202. The identification and authorization service may be based on known security mechanisms, such as, for example, a verification of a password. Using this service, the access to the device 202 from the remote location is only allowed after the remote location has been successfully identified and authenticated. The service for identifying and authenticating the remote location 224 may be provided by an application, which is installed on the smartcard 208 in addition to the (U)SIM application, which provides identification and authentication services to the mobile communication network 212.

Furthermore, the smartcard 208 comprises a control module providing an application logic to manage the communication between actors 206 and sensors 206 of the device 202 and the radio module 210 and—if they are present—the operator devices 220, 222. Among other functions, the control module is able to request and receive data from the sensors 204 of the device 202 and to forward the data to the remote location 224 via the radio module 210 and/or to the display device 220, which presents the data to a local operator. Likewise, the control module may be able to evaluate data received from the sensors 204 and send the result of the evaluation to the remote location 210 or the display device 220. For instance, this allows for generating summary data from the sensor signals and to provide the summary data to the remote location 224 or at the display device 220, Moreover, the control module is able to send control commands to the actuators 206 of the device 202.

Functions of the control module, such as requesting data or transmitting control commands to the device 202, may be triggered by a signal, that the control module receives from the remote location 224 via the radio module 210 or from the input device 222. Moreover, routines may be implemented in the control module that allow for performing functions automatically after the routines have been started from the remote location 224 or via the input device 222. In another exemplary embodiment, the control module is configured to start a routine when a quantity measured via a sensor 204 of the device 202 exceeds a predetermined threshold or to start a routine at a predetermined point in time. Moreover, the control module may receive from an actor 206 and/or a sensor 204 data, which is outputted automatically or upon an instruction from a further module of the device 202. Those data can also be passed to the radio module 210 by the control module.

The functions and routines of the control module are implemented into the smartcard 208 in form of a software program that is stored and executed in the microcontroller 218 of the smartcard 208.

Preferably, the smartcard 208 implements the so-called Java Card technology, which is known to the person skilled in the art in principle and which enables smartcards to run applications based on the Java programming language. These applications may also be referred to as Java Card Applets. Currently, the Java Card technology is specified in the Java Card 3.0 Platform Specification that can be downloaded from the webpage http://java.sun.com/javacard/3.0/specs.jsp. If the smartcard 208 supports the Java Card technology, the control module is preferably implemented in the form of one or more Java Card Applets executed in the microcontroller 218 of the smartcard 208. This enables the control module to be executed in smartcards 208 of different types or from different manufacturers without the need for card specific modifications.

Contained in the smartcard 208, the control module can be updated via the mobile communication network 212 via the OTA technology, which is, in principle, known to a person skilled in the art. The OTA technology is currently described in ETSI TS 102 225, ETSI TS 102 226 and in 3GPP TS 23.048 and allows for securely updating or changing data and/or applications in the smartcard 208 without having to reissue the card. The OTA technology uses a client/user architecture with a backend system comprising a database providing the data and an OTA gateway connected to the mobile communication network 212. The OTA gateway is typically operated by the mobile network operator and sends the update data to the smartcard 208 via the mobile communication network 212 and via the radio module 210. Usually the OTA technology uses the SMS for transmitting the update data to the smartcard 208. However, in principle, any bearer service of the mobile communication network 212 can be used.

The security mechanism of the OTA technology provides that the OTA gateway encrypts the data using a cryptographic key. The (U)SIM application decrypts the data using a corresponding decryption key, which is securely stored in the smartcard 208, thereby confirming that the data originates from the mobile network operator. If the data cannot be validated successfully, the microcontroller 218 denies access to its memory 216 and other functions, and the data cannot be stored in the smartcard 208. In one exemplary embodiment, symmetric keys are used in the OTA gateway and in the smartcard 208. In another exemplary embodiment, an asymmetric key pair may be used, where the OTA gateway uses an encryption key for encrypting the data and the smartcard 208 uses a corresponding decryption key for decrypting and verifying the data.

The radio module 210 may be connected to the smartcard 208 using the conventional interface, namely the interface between a radio module 210 and a smartcard 208, which particularly is described in ISO 7816-3 and the ETSI-specific extensions including ETSI/3GPP TS 102 221 and ETSI 102 223. The components of the device 202, particularly the sensors 204 and actuators 206 available and—if they are present—the operator devices 220, 222 may be connected to the smartcard 208 using the same interface. However, it is preferred to use another interface of the smartcard 208, particularly a USB interface or an SWP interface.

The recently standardized USB interface of the smartcard 208 is particularly described in ISO 7816-12 and ETSI TS 102 600. While the conventional interface of the smartcard 208 is aimed at the classical functionalities of such cards, such as their application in mobile communications, the USB interface of the smartcard 208 is a general purpose interface. Therefore, using the USB interface facilitates the data exchange with the control module of the smartcard 208.

In an alternative embodiment, the connection between the sensors 204, actuators 206 and the operator devices 220, 222 is established via the SWP. The SWP, which is particularly described in ETSI TS 102 613 is a protocol for communicating with a smartcard 208 that offers similar advantages as the USB in view of the implementation of the control module.

Figure 3:
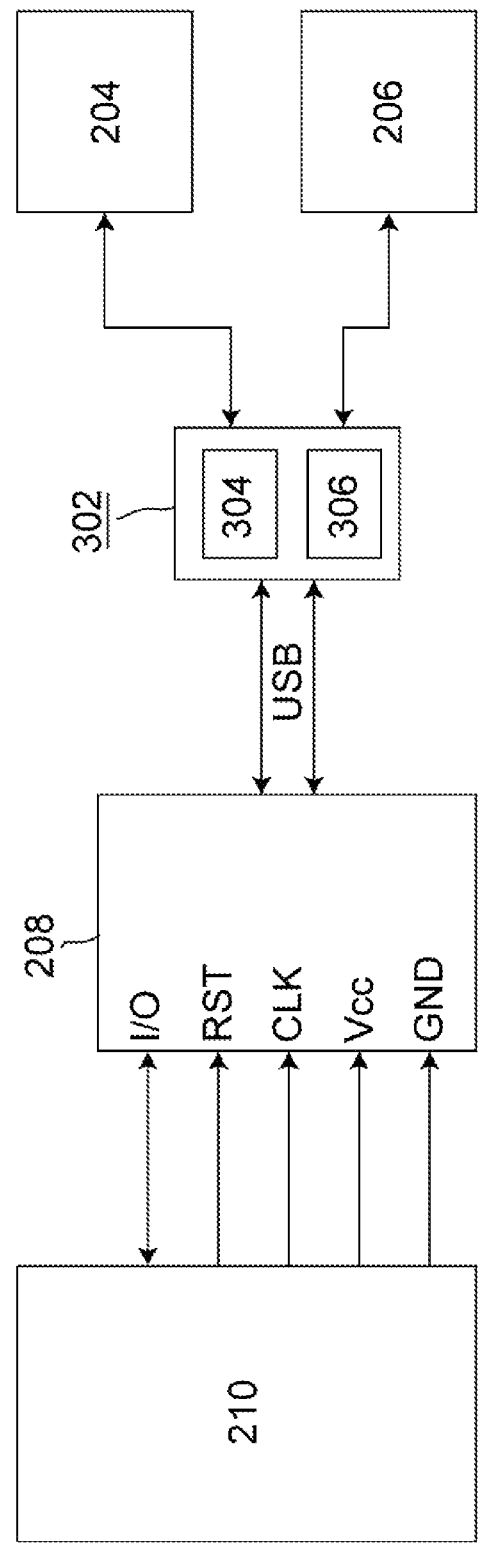
FIG. 3 is a schematic block diagram of another exemplary embodiment of the device shown in FIG. 2.

In another block diagram, FIG. 3 illustrates the connection between the smartcard 208 and the actuators 206 and sensors 204 and the connection between the smartcard 208 and the radio module 210 of the device 202 in one exemplary embodiment of the device 202 using USB. Particularly, FIG. 3 shows the contact configuration of the smartcard 208.

The smartcard 208 or the microcontroller 218 of the smartcard 208 comprises eight exemplary contacts usually referred to as C1 through C8. According to the smartcard standards—particularly the standard ISO 7816-2—the contacts have the following functions:

the contact C1 is named Vcc and used for the power supply of the microcontroller 218, the contact C2 is named RST and used for providing a reset signal to the microcontroller 218, the contact C3 is named CLK and used for providing a clock signal to the microcontroller 218, the contact C5 is named GND and used as the ground terminal and the contact C7 is named I/O and serves as the Input/Output terminal for a data exchange between the smartcard 208 and other devices; in mobile communications, the contact C7 is used for a connecting the smartcard 208 to the radio module 210.

The contacts C4, C6 and C8 are unused in the conventional contact configuration of the smartcard 208. However, the contact C6 is provided for a data exchange based on the SWP. The contacts C4 and C8, which are arranged adjacent to each other on the surface of the smartcard 208, are used for communicating with the smartcard 208 based on the USB.

In the exemplary embodiment depicted in FIG. 3, the connection between the smartcard 208 and the radio module 210 corresponds to the conventional contact configuration of the smartcard 208 in mobile communications. This means that the radio module 210 provides the power supply of the smartcard's 208 microcontroller 218 via the Vcc contact and that the radio module 210 and the smartcard 208 communicate via the I/O contact C7. Furthermore, the radio module 210 contacts the RST, CLK and GND contacts described before.

The actuators 206 and sensors 204 are not configured as USB devices, what is usually the case unless USB-enabled integrated components are used. For establishing a connection between the actuators 206 and sensors 204 on the one hand and the smartcard 208 on the other hand, the non-USB-enabled actuators 206 and sensors 204 are connected to an interface controller 302, which is connected to the smartcard 208 via a USB connection.

The interface controller 302 receives data from the actuators 206 or sensors 204 via its input/output terminals and forwards it to the smartcard 208 via the USB interface. Before forwarding the data to the smartcard 208, the interface controller 302 converts the data received from an actuator 206 or a sensor 204 into a format, which is used for exchanging data with the smartcard 208. Similarly, the interface controller 302 receives data in a specific format from the smartcard 208 and forwards the data to the recipient, i.e. an actuator 206 or a sensor 204 of the device 202.

Preferably, the interface controller 302 is equipped with an analog-to-digital converter (ADC) 304 and a digital-to-analog converter (DAC) 306 thereby allowing a data exchange between the smartcard 208 and an analog actuator 206 or sensor 204 of the device 202. The ADC 304 converts analog signals received from the actuator 206 or sensor 204 into digital signals before forwarding them to the smartcard 208 via the USB link. Similarly, the DAC 306 converts digital signals received from the smartcard 208 into analog signals that are forwarded to the actuator 206 or sensor 204.

In one exemplary embodiment, the interface controller 302 is a PIC microcontroller manufactured by Microchip Technology Inc., particularly a PIC16C745 microcontroller. This microcontroller offers the functionalities of the interface controller 302 described before including analog-to-digital and digital-to-analog conversion and is very cost-efficient.

As an alternative to the embodiment depicted in FIG. 3, the device 202 may comprise several interface controllers 302, each of which is assigned to one actuator 206 or sensor 204 or to a group of actuators 206 and/or sensors 204. Particularly, one of the interface controllers 302 and the actuators 206 and/or sensors 204 assigned thereto may form an integrated component of the device 202.

Moreover, it is possible to provide a connection based on the SWP or another protocol between the interface controller 302 or the plurality of interface controllers 302 and the smartcard 208 instead of the connection based on the USB.

The operator devices 220, 222, which are not shown in FIG. 3, may be connected directly to the smartcard 208, if they support a connection to one of the interfaces of the smartcard 208, particularly the USB interface. If operator devices 220, 222 provided in the device 202 do not support a direct connection to the interfaces of the smartcard 208, the operator devices 220, 222 are connected to the interface controller 302—or to one of the interface controllers 302, if several are provided—and data is exchanged between the operator devices 220, 222 and the smartcard 208 via the interface controller 302 as described before in connection with the actuators 206 and the sensors 204 of the device 202.

While exemplary embodiments of the invention have been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

For example, it is possible to operate an exemplary embodiment of the present invention wherein the communication network 212 is not configured as a mobile communication network 212, but as another communication network known to a person skilled in the art. Particularly, the device 202 may connect directly to the Internet or an Intranet. If the provided network does not require user identification and authorisation, the smartcard 208 may nevertheless provide a service for identifying and authenticating the remote location. This may also be the case if instead of the network connection a direct connection between the device 202 and the remote location 224 is provided, which is another possibility for connecting the device and the remote location.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

What is claimed is:

1. A device having remote access capability, comprising:
a connection module for connecting the device to a remote location;
a smartcard comprising a secure identification and/or authentication component; and
a control module, at least part of which is comprised in the smartcard, interfacing with the connection module and with a component of the device, the control module being adapted to access the component in conjunction with a communication between the control module and the remote location via the connection module, wherein the smartcard includes different interfaces for connecting to the component and to the connection module.

2. The device according to claim 1, wherein the device is connectable to the remote location via a communication network, which can be accessed via the connection module.

3. The device according to claim 1, wherein the smartcard and the component are connected via a USB interface or a SWP interface of the smartcard.

4. The device according to claim 1, comprising an interface controller connected between the smartcard and the component, the interface controller being adapted to communicate with the smartcard using a first connection type and to communicate with the component using a second connection type being different from the first connection type.

5. The device according to claim 4, wherein the first connection type includes a USB or a SWP connection.

6. The device according to claim 1, wherein the control module is modified based on data received via the connection module, if the data is cryptographically validated in the smartcard.

7. The device according to claim 6, wherein the data is encrypted via an encryption key and the validation of the data comprises decrypting the data using a decryption key corresponding to the encryption key, the decryption key being securely stored in the smartcard.

8. The device according to claim 1, wherein the control module is configured as a software application run on a microcontroller of the smartcard.

9. The device according to claim 8, wherein the smartcard is a Java Card and the software application is a Java Card Applet.

10. The device according to claim 1, wherein the component is configured as a sensor for measuring a quantity or as an actuator responsive to control signals received via the connection module.

11. The device according to claim 1, wherein the smartcard comprises a SIM or USIM application providing a secure identification and/or authentication service.

12. A smartcard for use in a remote access device having a connection module and a control module, the control module being adapted to access a component of the device in conjunction with a communication between the control module and a remote location via the connection module, the smartcard comprising a secure identification and/or authentication component, the smartcard comprising at least a part of the control module and the smartcard including different interfaces for connecting to the component and to the connection module.

13. A method for accessing a device from a remote location, comprising:
   providing a connection module for connecting the device to the remote location;
   providing a smartcard comprising a secure identification and/or authentication component;
   connecting the smartcard to the connection module and to a component of the device; and
   integrating a control module into the smartcard, the control module being adapted to access the component in conjunction with a communication between the control module and the remote location via the connection module, the smartcard including different interfaces for connecting to the component and to the connection module.

* * * * *